(12) United States Patent
Kumar

(10) Patent No.: US 6,944,864 B2
(45) Date of Patent: Sep. 13, 2005

(54) DYNAMIC ARCHITECTURE INTEGRATION TECHNIQUE

(75) Inventor: Alok Kumar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 624 days.

(21) Appl. No.: 10/003,319

(22) Filed: Dec. 6, 2001

(65) Prior Publication Data

US 2003/0110311 A1 Jun. 12, 2003

(51) Int. Cl.⁷ .............................................. G06F 15/163
(52) U.S. Cl. .......................................... 719/310; 707/6
(58) Field of Search .............................. 719/310; 707/6, 707/536

(56) References Cited

U.S. PATENT DOCUMENTS 5,940,845 A * 8/1999 Prager et al. ................ 715/536
6,507,817 B1 * 1/2003 Wolfe et al. ................. 704/260
6,598,015 B1 * 7/2003 Peterson et al. ............... 704/3

* cited by examiner

Primary Examiner—Meng-Al T. An
Assistant Examiner—LeChi Truong
(74) Attorney, Agent, or Firm—Lowe Hauptman Gilman & Berner, LLP; Paul W. Martin

(57) ABSTRACT

A hybrid technique for exchanging data files is described, i.e. dynamic architecture technique (DAT). Using the inventive technique, the producer and consumer applications work within the constraints of a "super schema". Consumers and producers of data are not required to know a priori the exact definition of data needed to be exchanged. Consumers and producers negotiate a data exchange format as a subset of the "super schema".

DAT is a dynamically defined application integration technique to help consumer applications handle dynamically changing input data formats. DAT covers the scenario where the producer application publishes the data and any application can subscribe to it. DAT also accounts for the scenario where a consumer application requires a different data exchange format and requests the producer application to create data files having a new format.

13 Claims, 3 Drawing Sheets

DYNAMIC ARCHITECTURE INTEGRATION TECHNIQUE

FIELD OF THE INVENTION

The present invention relates generally to a method of exchanging data among software applications. More particularly, the invention relates to a hybrid technique of exchanging data files including both publish and subscribe and request and response techniques.

BACKGROUND ART

There are two commonly used techniques for exchanging data among applications; 1) publish and subscribe, i.e. a push technique and 2) request and response, i.e. a pull technique.

The publish and subscribe technique assumes that the data producing application (referred to hereinafter as the producer) makes data available for data consumer applications (referred to hereinafter as the consumer). Using this technique, a consumer that knows the format of the data file can subscribe to it. The subscriber application must be preprogrammed to accept the data file it will receive. When the data is transferred using for instance, the extensible markup language (XML), a well-designed schema allows consumers to accept as input XML files that can be somewhat changed but a substantial change in the XML file structure may still require reprogramming the consumer.

The request and response technique assumes that consumers make requests for data and producers respond by sending the requested data in the correct format. Using this technique, the producer of the data has to know the format of the data to be sent when a request is made.

As described above, there are disadvantages associated with each of the techniques used for data exchange. Thus, there is a need in the art for a method of and system for data exchange using a hybrid technique including both publish and subscribe and request and response techniques.

DISCLOSURE/SUMMARY OF THE INVENTION

It is therefore an object of the present invention to provide a method of and system for data exchange using a hybrid technique including both publish and subscribe and request and response techniques.

The above described object is fulfilled by a hybrid technique for exchanging data files, i.e. dynamic architecture technique (DAT). Using the inventive technique, the producer and consumer applications work within the constraints of a "super schema." Consumers and producers of data are not required to know a priori the exact definition of data needed to be exchanged. Consumers and producers negotiate a data exchange format which is a subset of the "super schema."

DAT is a dynamically defined application integration technique to help consumer applications handle dynamically changing input data formats. DAT covers the scenario where the producer application publishes the data and any application can subscribe to it. DAT also accounts for the scenario where a consumer application requires a different data exchange format and requests the producer application to create data files having a new format.

In a computer implemented method aspect of exchanging data between software applications, a list of data fields used by one or more software applications is published. The published data fields are mapped to other published data fields. One or more of the software applications flag a subset of the mapped data fields. The flagged data fields are matched with a super-schema to define a sub-schema which is then used to validate data files to be exchanged by the one or more software applications.

In a computer system aspect, a processor receives and transmits data and a memory is coupled to the processor. The memory has sequences of instructions stored therein which, when executed by the processor, cause the processor to publish a list of data fields used by one or more software applications and map the published data fields to other published data fields. The processor also executes instructions flagging a subset of the mapped data fields and matching the flagged data fields with a super-schema to define a sub-schema. The sub-schema is then used to validate data files to be exchanged by one or more software applications.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for exchanging data among software applications are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessarily obscuring the present invention.

Top Level Description

Figure 1:
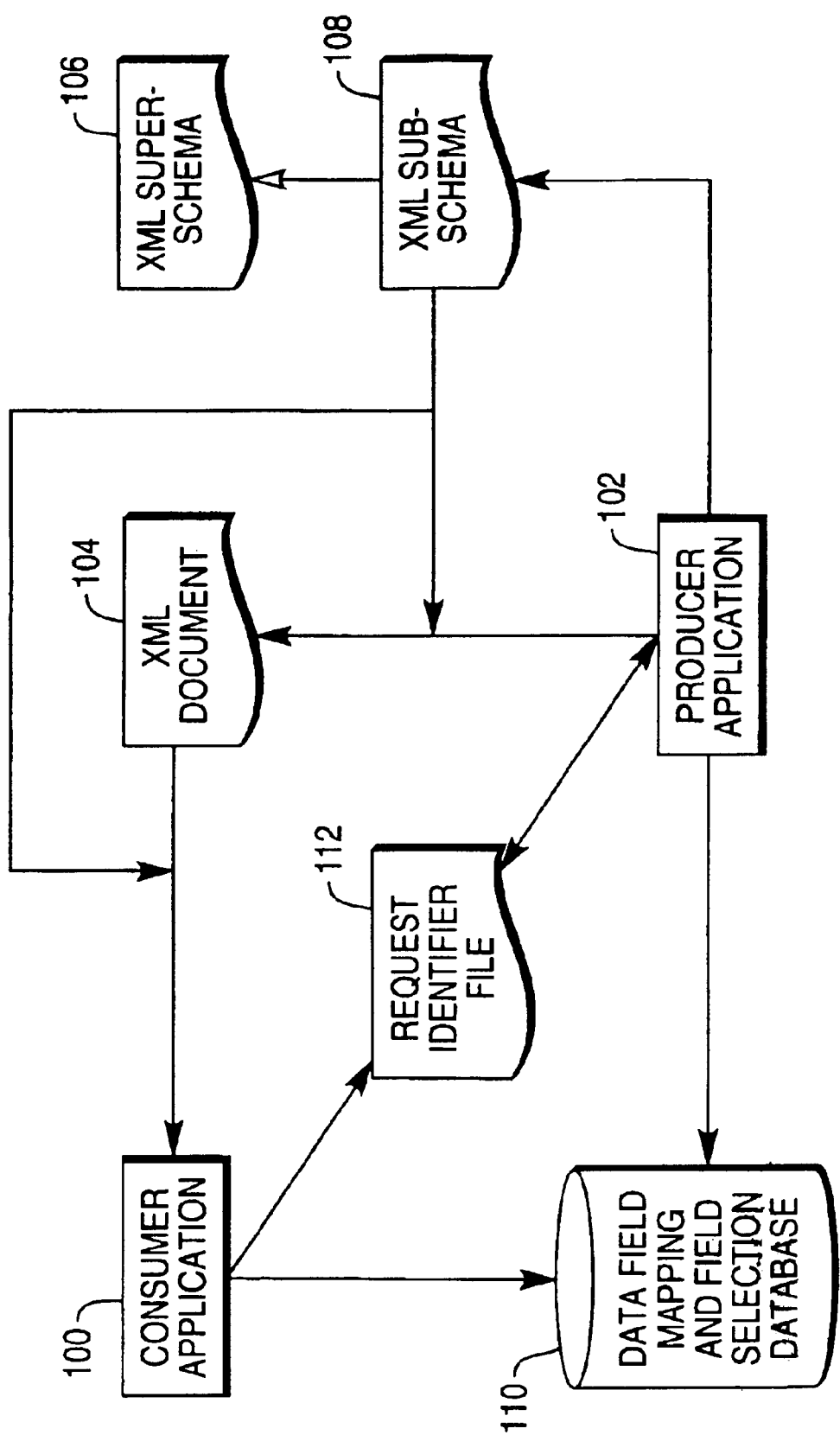
FIG. 1 is a high level functional block diagram of an embodiment of the present invention.

FIG. 1 is a top-level block diagram of an embodiment of the present invention, i.e., FIG. 1 is an overview of DAT. A consumer application 100 notifies a producer application 102 of required data and data format. Upon receiving the consumer application 100 request, the producer application 102 creates XML files or documents 104 useable by consumer application 100. An underlying basis for the present invention is that it is possible to identify industry-specific XML "super schema" 106. The super schema 106 is then useable to create an XML "sub-schema" 108 for a specific and narrowly scoped application integration scenario.

With further reference to FIG. 1, the producer application 102 publishes definitions of all its data fields into a data store 110, monitors a request identifier file 112, creates the XML file 104, and creates the "sub-schema" 108, i.e., a subset of the super schema 106. The consumer application 100 uses the producer application-generated XML file 104, publishes definitions of its data fields into the data store 110, marks the data fields making up the sub-schema 108, and flags the request identifier file 112. Request identifier file 112 is a file containing only one datum. The consumer application 100 changes this data in the file 112. For example, the value of the data is either zero (0) or negative one (−1) (or any set of predefined numbers). Zero (0) could be the default value and the significance of zero (0) changing to negative one (−1) (or any other number) is the consumer application 100 needs a different set of data. The data is monitored by the producer application 102. As long as producer application 102 sees a value zero (0) it does nothing. When producer 102 sees a value other than zero (0), it looks in data field mapping store 118 and creates a new sub-schema 108 and any corresponding XML file 104.

The data store 110 includes a list of all data fields for both the producer and consumer applications 102, 100. The data store 110 also includes a mapping of specific fields in the consumer application 100 in relation to fields in the producer application 102. The request identifier file 112 includes data identifying changes in the data store 110, as described above. The request identifier file 112 data is monitored by the producer application 102, as described above.

DETAILED DESCRIPTION

Figure 2:
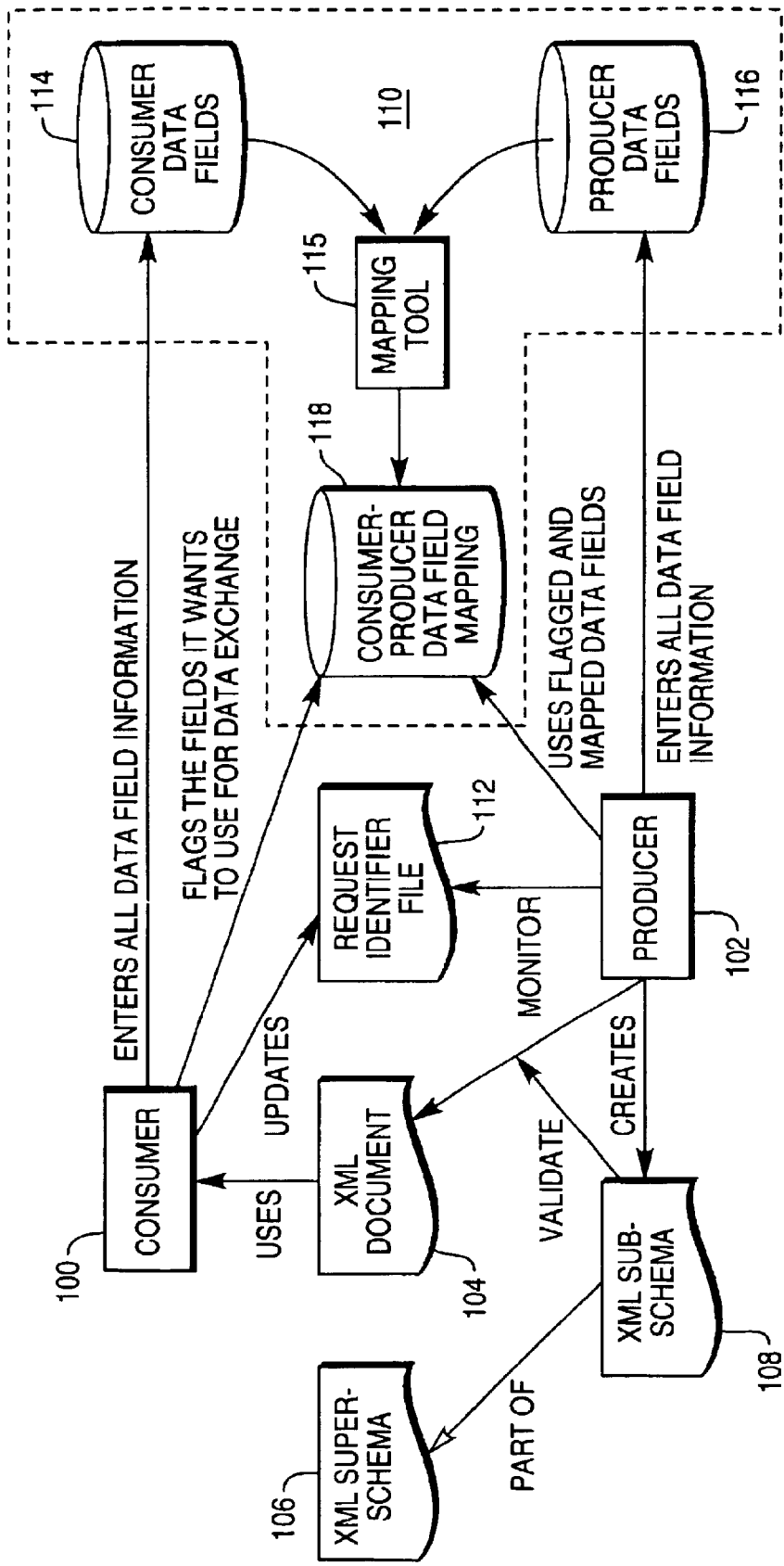
FIG. 2 is a functional block diagram of an embodiment of the present invention.

FIG. 2 is a detailed block diagram of a detailed embodiment of the DAT architecture of FIG. 1. Consumer and producer applications 100, 102 publish a list of all the data fields they use into the data store 110. Specifically, consumer application 100 stores a list of its data fields in consumer data field data store 114 and producer application 102 stores a list of its data fields in producer data field data store 116.

A mapping tool 115 maps the data fields of the producer application 102 (stored in the producer data field data store 116) to the data fields of the consumer application 100 (stored in the consumer data field data store 114) thereby defining how the data fields of the two applications are related. The data field mapping is stored in the data field mapping data store 118. The consumer application 100 flags relevant producer and consumer data fields in the database as a first step toward defining a default data exchange XML "sub schema" 108.

The producer application 102 matches the flagged data fields in data field mapping store 118 with the "super schema" 106 to define and create a default "sub-schema" 108. All data files, e.g., XML document 104, created by the producer application 102 to facilitate data exchange use the sub-schema 108 for validation.

However, if consumer application 100 needs data from the producer application 102 in a different format, the consumer application 100 flags the required fields in the data store 110 and inserts a flag in the request identifier file 112. Producer application 102 may also flag fields added. Producer application 102 monitors the request identifier file 112 and when a newly set flag, indicating the selection of one or more data fields by either consumer 100 or producer 102, is detected, the producer application 102 maps the data fields of data stores 114 and 116 again and stores a revised data field mapping in data field mapping data store 118. Then, the producer application 102 creates a new XML sub-schema 108 based on a revised data field mapping in data field mapping data store 118.

When the consumer application changes the flags in the Request Identifier File 112, it also makes some entries (which could be changing N to Y in date fields) in data field mapping store 118 to indicate which fields it wants to be used in the XML file 104. The producer application 102 selects the data fields from data field mapping store 118 by checking which of the data fields have a Y associated with them.

Based on the new XML sub-schema 108, the producer application 102 creates new XML files 104 for data exchange. The producer application 102 validates the new XML files 104 using the new XML sub-schema 108.

The operation of the present invention is demonstrated by an example of an application determining what promotions need to be given to a particular shopper. The promotion can be calculated based on many factors:

Item purchased;
Number of items purchased;
Basket of items purchased;
Type of consumer;
Day of the week or year; and
Time of the day.

It may be desirable to have promotions defined by a particular set of parameters during morning hours, while changing the set of parameters during early evening hours due to greater traffic and changing it back to the original set (morning hours) in late evenings. Using the above-described invention, the store operator will not have to bring down or close a lane to change the parameters. The store manager can access the server, change the parameters to use for promotion determination, and have the change take place on the lane because the application starts using the new XML promotions file. This is all transparent to the person and cashier in the checkout lane.

Hardware Overview

Figure 3:
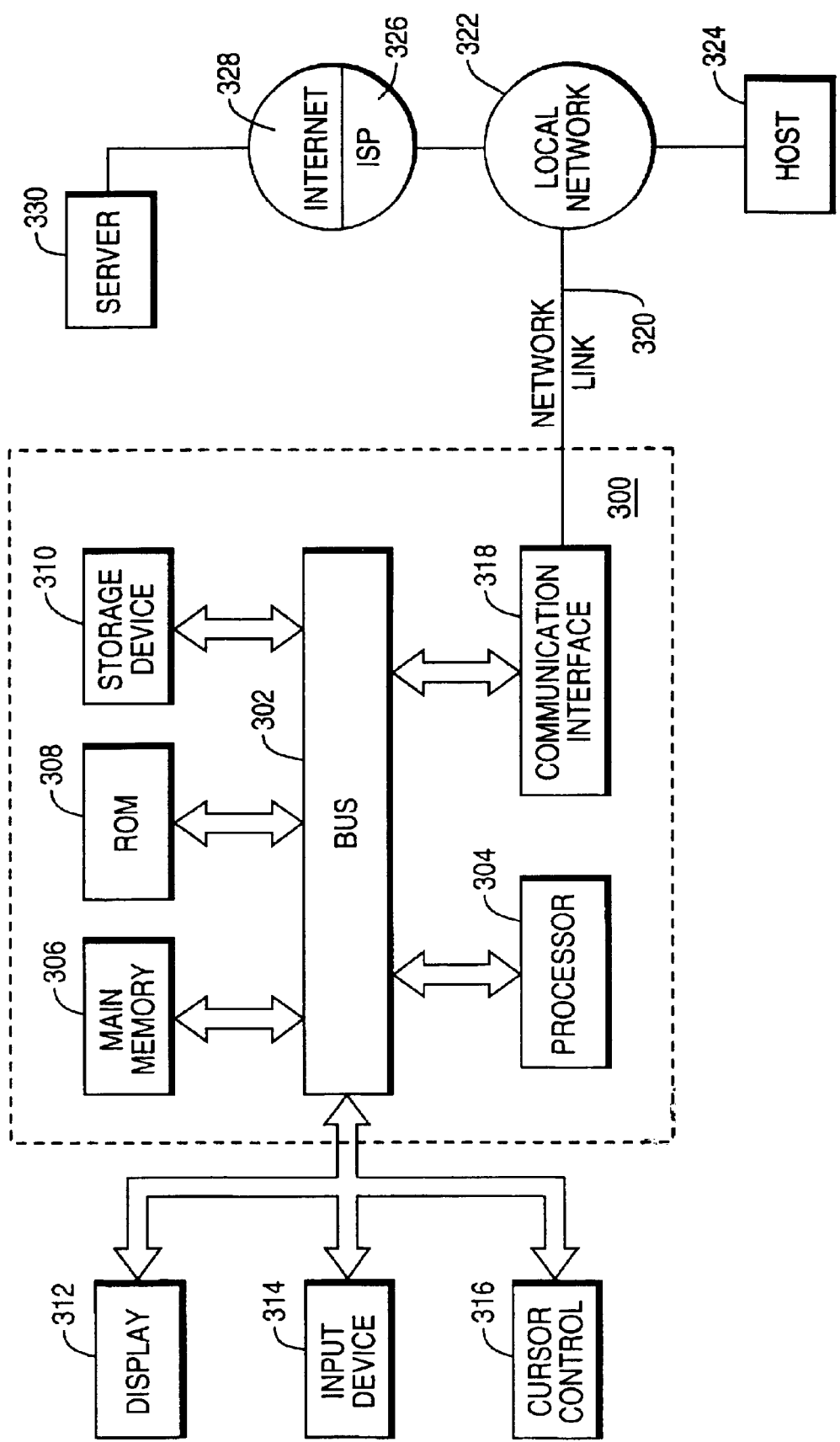
FIG. 3 is a high level block diagram of a computer system for use with an embodiment of the present invention.

FIG. 3 is a block diagram illustrating an exemplary computer system 300 upon which an embodiment of the invention may be implemented. The present invention is usable with currently available personal computers, mini-mainframes and the like.

Computer system 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing transaction and interaction data, and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, such as a magnetic disk or optical disk, is provided and coupled to the bus 302 for storing transaction and interaction data, inventory data, orders data, and instructions.

Computer system 300 may be coupled via the bus 302 to a display 312, such as a cathode ray tube (CRT) or a flat panel display. An input device 314, including alphanumeric and function keys, is coupled to the bus 302 for communicating information and command selections to the processor 304. Another type of user input device is cursor control 316, such as a mouse, a trackball, or cursor direction keys for communicating direction information and command selections to processor 304 and for controlling cursor movement on the display 312. This input device typically has two degrees of freedom in two axes, a first axis (e.g., x) and a second axis (e.g., y) allowing the device to specify positions in a plane.

The invention is related to the use of computer system 300, such as the illustrated system of FIG. 3, to provide a method of exchanging data among software applications using a hybrid technique of exchanging data files including both a) publish and subscribe and b) request and response techniques. According to one embodiment of the invention, consumer application 100 notifies producer application 102 of required data, as described above, and the producer application 102 creates XML files 104 useable by the consumer application 100. The producer application 102 creates an XML sub-schema which is used by the consumer application 100 to determine the data fields to be used for data exchange. The computer system 300 performs the foregoing in response to processor 304 executing sequences of instructions contained in main memory 306 in response to input received via input device 314, cursor control 316, or communication interface 318. Such instructions may be read into main memory 306 from another computer-readable medium, such as storage device 310.

However, the computer-readable medium is not limited to devices such as storage device 310. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 306 causes the processor 304 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 300 also includes a communication interface 318 coupled to the bus 302. Communication interface 308 provides two-way data communication as is known. For example, communication interface 318 may be an integrated services digital network (ISDN) card, a digital subscriber line (DSL) card, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals which carry digital data streams representing various types of information. Of particular note, the communications through interface 318 may permit transmission or receipt of the requested data and data format, XML files (super-schema and sub-schema), data store, and request identifier files. For example, two or more computer systems 300 may be networked together in a conventional manner with each using the communication interface 318.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for exchanging data among software applications.

The received code may be executed by processor 304 as it is received, and/or stored in storage device 310, or other non-volatile storage for later execution. In this manner, computer system 300 may obtain application code in the form of a carrier wave.

Advantageously, DAT includes a very loosely coupled architecture facilitating interoperability of applications. The applications are interoperable as long as they follow the constraints of the super-schema defined for the industry segment.

Further advantageously, DAT accommodates both "publish and subscribe" and "request and respond" application integration scenarios. Publish and subscribe covers most situations of application integration; however, there are situations where the consumer application needs to define to the producer application in the format in which it requires received data. In particular, these situations can arise if application from different vendors are exchanging data and all vendors have their own proprietary data file format. Further, if an application learns from past experience, e.g., artificial intelligence applications, the application may need to define the format for received data. For example, an intelligent agent may determine that a process can be performed more efficiently if it can receive some data not currently received. The agent may request the extra data from the producer application.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of exchanging data between software applications comprising:

publishing a list of one or more data fields used by one or more software applications;

mapping the published data fields;

flagging mapped data fields by at least a first one of the software applications;

matching flagged data fields with a super-schema to define a sub-schema by at least a second one of the software applications; and creating a file containing information from the flagged data fields using the sub-schema by the second one of the software applications;

using the sub-schema to validate data files to be exchanged by the second one of the software applications; and sending the file to the second one of the software applications by the first one of the software applications.

2. The method as claimed in claim 1 further comprising:

monitoring published data field for flag changes.

3. The method as claimed in claim 2 further comprising:

updating the sub-schema in accordance with monitored flag changes of the published data fields.

4. A computer implemented method of a first software application exchanging data with a second software application comprising:

publishing a list of one or more data fields used by the first software application; wherein the published data fields are mapped to a list of data fields used by the second software application;

flagging a subset of the mapped published data fields by the second software application, wherein the flagged data fields are matched with a super-schema to define a sub-schema;

creating a file containing information from the flagged data fields using the sub-schema by the first software application;

using the sub-schema to validate data files to be exchanged with the second software application by the first software application; and sending the file to the second software application by the first software application.

5. The method as claimed in claim 4 further comprising:

monitoring published data field for flag changes.

6. The method as claimed in claim 5 further comprising:

updating the sub-schema in accordance with monitored flag changes of the published data fields.

7. A computer implemented method of a first software application exchanging data with a second software application comprising:

receiving a list of one or more data fields used by the second software application by the first software application;

mapping the received data fields to a list of data fields used by the first software application by the second software application;

receiving a request identifier file flagging a subset of the mapped received data fields by the first software application;

matching the flagged data fields with a super-schema to define a sub-schema by the first software application;

creating a file containing information from the flagged data fields using the sub-schema by the first software application;

using the sub-schema to validate data files to be exchanged with the second software application by the first software application; and sending the file to the second software application by the first software application.

8. The method as claimed in claim 7 further comprising:

monitoring published data field for flag changes.

9. The method as claimed in claim 8 further comprising:

updating the sub-schema in accordance with monitored flag changes of the published data fields.

10. A computer system for exchanging data between software applications comprising:

a processor for receiving and transmitting data; and a memory coupled to the processor, the memory having stored therein sequences of instructions which, when executed by the processor, cause the processor to publish a list of one or more data fields used by one or more software applications, map the published data fields to other published data fields, flag a subset of the mapped data fields by at least a first one of the software applications, match the flagged data fields with a super-schema to define a sub-schema by at least a second one of the software applications, create a file containing information from the flagged data fields using the sub-schema by the second one of the software applications, use the sub-schema to validate data files to be exchanged by the one or more software applications by the second one of the software applications, and send the file to the first one of the software applications by the second one of the software applications.

11. The system as claimed in claim 10 further comprising instructions which, when executed by the processor, cause the processor to:

monitor published data fields for flag changes.

12. The system as claimed in claim 11 further comprising instructions which, when executed by the processor, cause the processor to:

update the sub-schema in accordance with monitored flag changes of the published data fields.

13. A computer implemented method of exchanging information between first and second software applications comprising:

publishing a first list of first fields of the first software application in a first store by the first software application;

publishing a second list of second fields of the second software application in a second store by the second software application, which is requesting the information from the first software application;

mapping the first and second fields;

flagging a number of mapped fields by the second software application;

matching flagged fields with a super-schema to define a sub-schema by the first software application;

creating a file containing the information from the flagged fields using the sub-schema by the first software application;

using the sub-schema to validate the file by the first software application; and sending the file to the second software application by the first software application.

* * * * *